US012762806B2

(12) United States Patent
Colafrancesco et al.

(10) Patent No.: US 12,762,806 B2
(45) Date of Patent: Oct. 13, 2026

(54) METHOD FOR VISUAL POSE DETERMINATION OF UNKNOWN OBJECTS IN A MIXED REALITY CONTEXT

(71) Applicant: Qorvo US, Inc., Greensboro, NC (US)

(72) Inventors: Julien Colafrancesco, Paris (FR); Han Wesseling, Seoul (KR)

(73) Assignee: Qorvo US, Inc., Greensboro, NC (US)

( * ) Notice: Subject to any disclaimer, the term of this patent is extended or adjusted under 35 U.S.C. 154(b) by 154 days.

(21) Appl. No.: 18/586,003

(22) Filed: Feb. 23, 2024

(65) Prior Publication Data

US 2024/0338906 A1 Oct. 10, 2024

Related U.S. Application Data

(60) Provisional application No. 63/494,136, filed on Apr. 4, 2023.

(51) Int. Cl.
*G06T 19/00* (2011.01)
*G06T 7/73* (2017.01)

(52) U.S. Cl.
CPC .............. *G06T 19/006* (2013.01); *G06T 7/75* (2017.01)

(58) Field of Classification Search
CPC .......... G06T 19/006; G06T 7/75; G06F 3/011
See application file for complete search history.

(56) References Cited

U.S. PATENT DOCUMENTS

| | | | | |
|---|---|---|---|---|
| 11,138,472 | B2 | 10/2021 | Sommer et al. | |
| 11,172,208 | B2 | 11/2021 | Curcio et al. | |
| 11,200,745 | B2 * | 12/2021 | Johnson | G06T 7/0002 |
| 2010/0166317 | A1 * | 7/2010 | Li | G06F 18/2148 382/209 |
| 2021/0385654 | A1 * | 12/2021 | Ohashi | H04W 12/068 |
| 2022/0020217 | A1 * | 1/2022 | Hill | G06F 3/011 |
| 2022/0206102 | A1 * | 6/2022 | Brown | G06F 3/012 |
| 2023/0266433 | A1 * | 8/2023 | Wang | G01S 5/14 342/458 |
| 2023/0306690 | A1 * | 9/2023 | Brown | G06T 3/40 |
| 2023/0343091 | A1 * | 10/2023 | Guo | G06V 10/245 |
| 2024/0013601 | A1 * | 1/2024 | Saleh | G07C 9/22 |

* cited by examiner

*Primary Examiner* — Grace Q Li

(74) *Attorney, Agent, or Firm* — Withrow & Terranova, P.L.L.C.

(57) ABSTRACT

The present disclosure relates to a mixed reality (MR) system merging computer-generated elements and real-world elements, and a method for determining visual poses of unknown real-world objects in the MR system. The disclosed system includes a recognition device and an object of interest that constitutes a real-world environment. Herein, the recognition device and the object of interest are capable of communicating with each other. The recognition device is capable of estimating a visual pose of the object of interest without pre-storing characteristics of the object of interest and configured to re-project a visual representation of the object of interest into a virtual reality (VR) environment based on the estimated visual pose.

23 Claims, 4 Drawing Sheets

METHOD FOR VISUAL POSE DETERMINATION OF UNKNOWN OBJECTS IN A MIXED REALITY CONTEXT

RELATED APPLICATIONS

This application claims the benefit of U.S. provisional patent application Ser. No. 63/494,136, filed Apr. 4, 2023, the disclosure of which is hereby incorporated herein by reference in its entirety.

FIELD OF THE DISCLOSURE

The present disclosure relates to a mixed reality (MR) system merging computer-generated elements and real-world elements (i.e., a combination of a virtual reality system and an augmented reality system), and a method for determining visual poses of unknown objects in the MR system, where the unknown objects constitute a user's real-world environment.

BACKGROUND

A mixed reality (MR) system is an interactive system, which merges computer-generated elements and real-world elements (i.e., a combination of a virtual reality system and an augmented reality system). The capability to determine a visual pose (i.e., a combination of position and orientation) of objects that constitute a user's real-world environment is one of the most important features of the MR system. Such capability enables interactions between physical and digital worlds, so as to enhance the user's experience.

A widespread application of this capability is determining a pose of hand controllers from the perspective of a headset worn by the user. In the MR context, this allows the user to use his/her hands to interact with digital objects composing a virtual reality (VR)/artificial environment. Conventional methods for determining the pose include installing light emitting diodes (LEDs) on the hand controllers in a very specific geometrical pattern and blinking in specific temporal patterns. The LEDs act as markers allowing easy pose recognition by analyzing the video flux captured by a camera equipped on the headset worn by the user.

These conventional methods typically rely on the following hypothesis: 1) the shapes of the objects to recognize (e.g., the hand controllers) are known a priori by the headset; 2) the temporal and spatial LED patterns are known a priori by the headset; and 3) the number of objects to recognize (e.g., the hand controllers) are known a priori by the headset. However, these hypotheses are not always viable when an object of interest and the headset used for recognition are sold separately, especially from different manufacturers. A classic example of an object of interest that is sold separately from the headset and proved as useful is a couch. Determining a pose of the couch, which composes the user's real home, allows the couch's re-projection into the VR/artificial environment, so the user can really sit in the VR/artificial environment and benefit from all the tactile experiences related to sitting on the couch. A tactile sensation is one of the most important senses generally lacking from VR experiences.

There are two main challenges in detecting visual poses of objects that constitute the user's real-world environment and provide a tactile experience in the VR/artificial environment. First, the objects (e.g., couches, tables, etc.) can have different characteristics in size, shape, texture, and/or color. Therefore, it is very difficult to pre-store all possible characteristics in the headset. Second, the objects may change in scale, orientation, and/or placement in the real-world environment, and may even appear only partially. As such, even if the characteristics of the objects are available, it would still be difficult to estimate the visual pose of the objects based solely on the characteristics of the objects.

Accordingly, there remains a need for an improved MR system design to estimate visual poses of objects in the MR systems, specifically for the objects that are unknown to recognition devices before estimation.

SUMMARY

The present disclosure relates to a mixed reality (MR) system merging computer-generated elements and real-world elements (i.e., a combination of a virtual reality system and an augmented reality system), and a method for determining visual poses of unknown real-world objects in the MR system. The disclosed MR system includes a recognition device and an object of interest that constitutes a real-world environment. Herein, the recognition device and the object of interest are capable of communicating with each other. The recognition device is capable of estimating a visual pose of the object of interest without pre-storing characteristics of the object of interest and configured to re-project a visual representation of the object of interest into a virtual reality (VR) environment based on the estimated visual pose.

In one embodiment of the MR system, the recognition device includes a first wideband module, and the object of interest includes a second wideband module. The first wideband module of the recognition device and the second wideband module of the object of interest are capable of communicating with each other via wideband radio.

In one embodiment of the MR system, the recognition device further includes a detecting module, which is configured to detect a presence of the object of interest.

In one embodiment of the MR system, the detecting module is configured to send out periodical beacons. The second wideband module is configured to listen to the periodical beacons and to send a response back to the detecting module in response to the periodical beacons. The detecting module is configured to receive the response from the second wideband module so as to detect the presence of the object of interest. Once the first wideband module is notified of the presence of the object of interest, the first wideband module is configured to send a characteristic request of the object of interest to the second wideband module. The second wideband module is configured to send at least one characteristic of the object of interest to the first wideband module in response to the characteristic request. Herein, the at least one characteristic of the object of interest is one of a three-dimensional (3D) model of the object of interest, a series of photos of the object of interest under different perspectives, and an identifier of the object of interest.

In one embodiment of the MR system, the second wideband module is configured to actively send out a probe request, and the detecting module is configured to receive the probe request from the second wideband module and to send a probe response back to the second wideband module to confirm a reception of the presence of the object of interest. Once the second wideband module receives the probe response, the second wideband module is configured to send at least one characteristic of the object of interest to the first wideband module.

In one embodiment of the MR system, the second wideband module is configured to send at least one characteristic of the object of interest to the first wideband module after the presence of the object of interest is detected. Herein, the at least one characteristic of the object of interest is stored in a memory within the object of interest.

In one embodiment of the MR system, the at least one characteristic of the object of interest is the identifier of the object of interest. The first wideband module is configured to query an external database for the 3D model or the photos of the object of interest based on the identifier of the object of interest.

In one embodiment of the MR system, the recognition device is configured to obtain a coarse pose estimation of the object of interest via wideband radio. The coarse pose estimation of the object of interest includes a distance estimation between the recognition device and the object of interest, and an orientation estimation of the object of interest.

In one embodiment of the MR system, the recognition device is configured to obtain a fine pose estimation of the object of interest by matching reference images to image features extracted from a segment of video flux provided by a camera within the recognition device. Herein, the reference images are obtained from the at least one characteristic of the object of interest, and a search range of the matching process is limited by the coarse pose estimation of the object of interest.

In one embodiment of the MR system, the coarse pose estimation of the object of interest further determines whether the object of interest is in a field of view of the recognition device.

In one embodiment of the MR system, the recognition device is configured to obtain the fine pose estimation of the object of interest only when the coarse pose estimation of the object of interest determines that the object of interest is in the field of view of the recognition device.

In one embodiment of the MR system, the coarse pose estimation of the object of interest further anticipates when the object of interest will come into the field of view of the recognition device if it is determined that the object of interest is not currently in the field of view of the recognition device.

In one embodiment of the MR system, the object of interest is configured to provide location metrics, which at least include information of the orientation estimation of the object of interest with respect to the recognition device. The recognition device is configured to obtain the location metrics from the object of interest.

In one embodiment of the MR system, the recognition device further includes a location sensing module and a location estimation module. Upon receiving a presence notice of the object of interest from the detecting module, the location sensing module is configured to acquire radio frequency (RF) signals related to spatial information of the object of interest. The location sensing module is configured to provide location metrics to the location estimation module. The location metrics at least include information of the orientation estimation of the object of interest from the perspective of the recognition device. The location estimation module is configured to provide location coordinates based on the location metrics. Herein, the location metrics are one or more of Angle of Arrival (AoA), Time of Arrival (ToA), Phase Difference of Arrival (PDoA), and Time Difference of Arrival (TDoA). The location coordinates are spatial 3D coordinates in x, y, and z dimensions, spherical coordinates, or cylindrical coordinates.

In one embodiment of the MR system, the recognition device further includes a camera, an image acquisition module, an image processing module, and a tracking module. Herein, the camera is configured to capture live video flux of the object of interest. The image acquisition module is configured to acquire image frames based on the captured video flux from the camera. The image processing module is configured to process the image frames to provide image features. The tracking module is configured to calculate a fine pose of the object of interest by matching reference images of the object of interest to the image features provided by the image processing module. The reference images are obtained from the first wideband based on the at least one characteristic of the object of interest. A search range of the matching process is limited by the coarse pose estimation of the object of interest.

In one embodiment of the MR system, the location estimation module includes a memory that is configured to store the location coordinates and configured to provide the location coordinates to the tracking module. The search range of the matching process is limited by using the coordinates provided by the memory.

In one embodiment of the MR system, the recognition device further includes a rendering module that is configured to compute the visual representation of the object of interest based on the calculated fine pose of the object of interest from the tracking module and the reference images of the object of interest from the first wideband module.

In one embodiment of the MR system, the rendering module is further configured to combine the visual representation of the object of interest with artificial virtual objects in a form of "layers" superimposed to video flux.

According to one embodiment, a recognition device within a MR system at least includes a camera, a first wideband module, a tracking module, and a rendering module. The first wideband module is capable of communicating with an object of interest to obtain characteristics of the object of interest, thereby obtaining reference images of the object of interest. Herein, the object of interest constitutes a real-world environment, and the recognition device does not pre-store the characteristics of the object of interest. The tracking module is configured to calculate a visual pose of the object of interest by matching the reference images of the object of interest to image features extracted from a segment of video flux provided by the camera. The rendering module is configured to compute a visual representation of the object of interest based on the calculated visual pose of the object of interest and the reference images of the object of interest.

According to one embodiment, an exemplary method for visual pose determination of an object of interest in a MR system starts with advertising a presence of the object of interest to a recognition device. Next, data is transmitted between the object of interest and the recognition device. Herein, the object of interest constitutes a real-world environment. The transmitted data includes at least one characteristic of the object of interest, which is not pre-stored in the recognition device. A coarse pose estimation of the object of interest is performed, where the coarse pose estimation of the object of interest includes a distance estimation between the recognition device and the object of interest, and an orientation estimation of the object of interest. A fine pose estimation of the object of interest is then performed based on the coarse pose estimation of the object of interest.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 4:
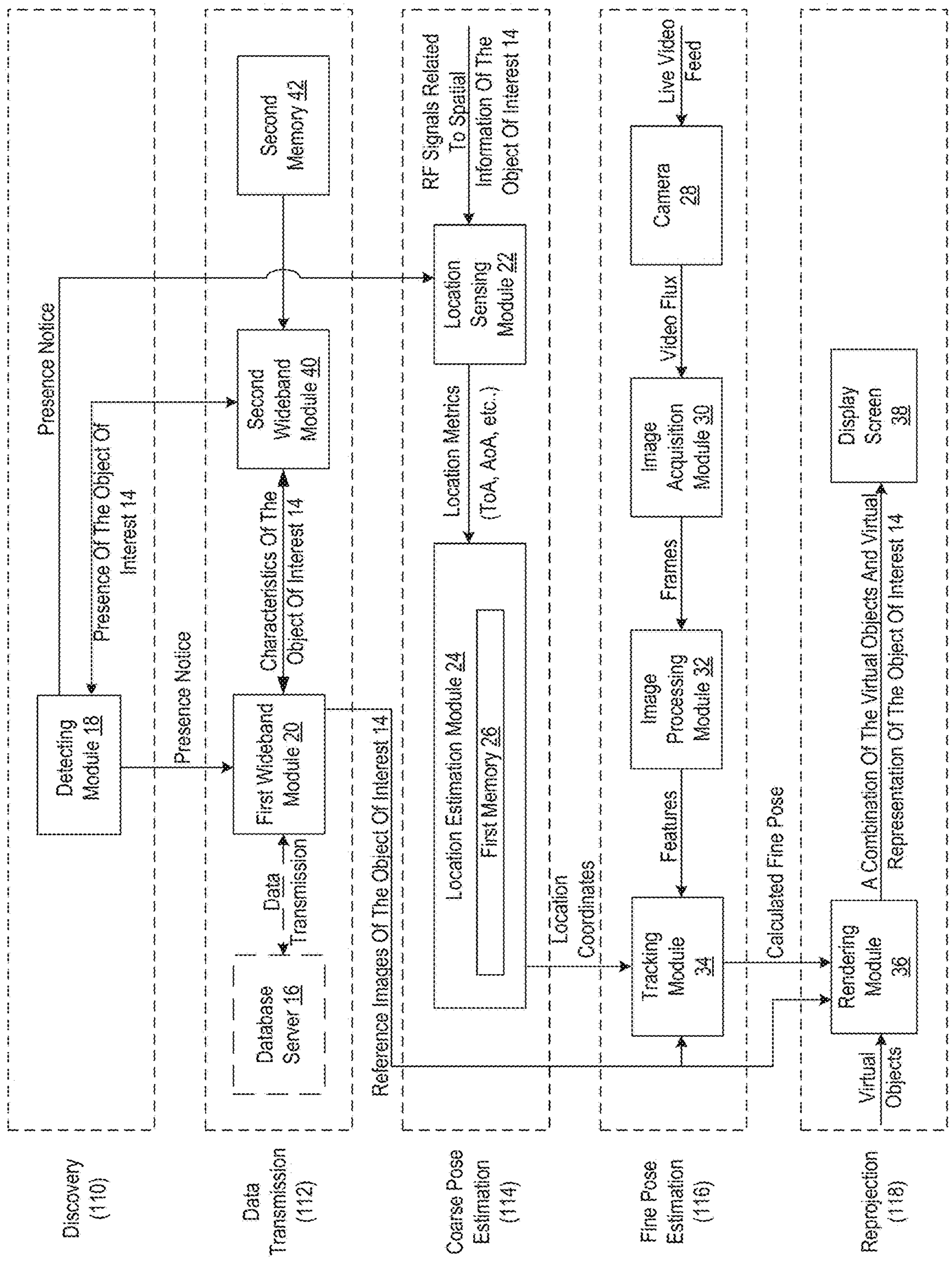

FIG. 4 provides a flow diagram that illustrates an exemplary process of determining a visual pose of the object of interest in the MR system according to some embodiments of the present disclosure.

It will be understood that for clear illustrations, FIGS. 1-4 may not be drawn to scale.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to a mixed reality (MR) system merging computer-generated elements and real-world elements (i.e., a combination of a virtual reality system and an augmented reality system), and a method for determining visual poses of unknown objects in the MR system, where the unknown objects constitute a user's real-world environment. The disclosed MR system includes radio application modules (e.g., wideband modules) applied on both a recognition side (e.g., one or more recognition devices) and a to-be recognized side (e.g., one or more objects of interest), such that the recognition side and the to-be recognized side can communicate via wideband radio.

Figure 1:
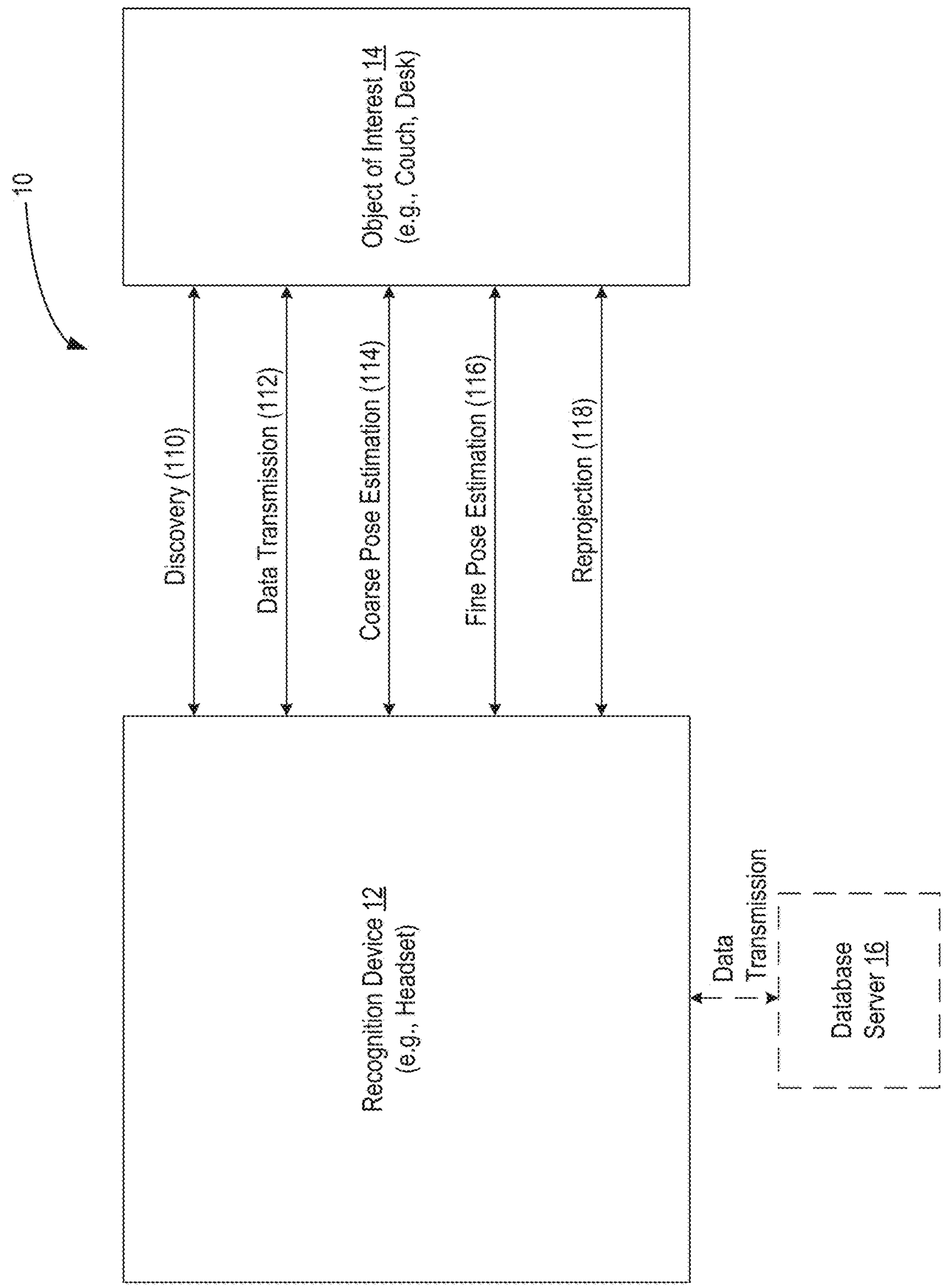
FIG. 1 illustrates an exemplary mixed reality (MR) system including a recognition device and an object of interest according to some embodiments of the present disclosure.

FIG. 1 illustrates an exemplary MR system 10 that includes a recognition device 12 (e.g., headset), an object of interest 14, and an optional database server 16 according to some embodiments of the present disclosure. Herein, the object of interest 14 is an element that constitutes a real-world environment of a user (not shown), such as a couch, a desk, etc. Within the MR system 10, the recognition device 12 and the object of interest 14 are capable of communicating with each other, such that the recognition device 12 is capable of estimating a visual pose of the object of interest 14 without pre-storing information of the object of interest 14 as a priori. Herein, both the recognition device 12 and the object of interest 14 may include radio application modules (not shown) for wideband radio communication. In addition, the recognition device 12 is capable of re-projecting a visual representation of the object of interest 14 into a virtual reality (VR)/artificial environment based on the estimated visual pose. In different applications, the MR system 10 may include more than one recognition device 12 and/or more than one object of interest 14.

In one embodiment, there are multiple steps performed between the recognition device 12 and the object of interest 14 to superimpose the visual representation of the object of interest 14 into the VR/artificial environment. First, a discovery step (step 110) is initiated, so that the presence of the object of interest 14 is advertised to the recognition device 12. The discovery step may be implemented passively or actively in different applications. With a passive scan, the object of interest 14 is configured to listen to periodical beacons sent by the recognition device 12, and to send a response back to the recognition device 12 once such beacons are received by the object of interest 14. Alternatively, with an active scan, the object of interest 14 is configured to actively send out a probe request and wait for a potential probe response from the recognition device 12. The discovery step may be performed through wideband radio or through an alternative out of band radio (e.g., Bluetooth).

After the presence of the object of interest 14 is advertised to the recognition device 12, a data transmission step (step 112) is performed between the object of interest 14 and the recognition device 12 via the wideband radio or through the out of band radio (e.g., Bluetooth). The data transmission step may also be implemented passively or actively in different applications. For passive data transmission, the recognition device 12 will send a data request to the object of interest 14 asking for characteristics of the object of interest 14, and the object of interest 14 then sends the characteristics back to the recognition device 12 according to the data request. For active data transmission, after the object of interest 14 receives the probe response from the recognition device 12, which responds to the probe request from the object of interest 14, the object of interest 14 will actively send its characteristics to the recognition device 12. Herein, the characteristics of the object of interest 14 may be a three-dimensional (3D) model of the object of interest 14, a series of photos of the object of interest 14 under different perspectives, or an identifier (e.g., a manufacturer of the object of interest 14 and a serial number of the object of interest 14) that is sufficient for the recognition device 12 to query an external database (e.g., a web database from the optional database server 16) for the 3D model or photos of the object of interest 14. Herein, once the recognition device 12 receives the characteristics of the object of interest 14, the recognition device 12 is capable of obtaining size, shape, texture, and/or color of the object of interest 14.

In addition, the wideband radio/the out of band radio is also utilized in a coarse pose estimation step (step 114), which is performed after the discovery step (step 110), and may be performed before, after, or simultaneously with the data transmission step (step 112). The coarse pose estimation step may be implemented through a variety of spatial estimation procedures, such that the recognition device 12 is configured to obtain a coarse pose estimation of the object of interest 14 (e.g., a coarse estimation of distance/position and orientation/azimuth). For instance, single-sided ranging or double-sided two-way ranging is used to get a distance from the object of interest 14 to the recognition device 12. Angle of Arrival (AoA), Time of Arrival (ToA), Phase Difference of Arrival (PDoA), and/or Time Difference of Arrival (TDoA) may be performed on a side of the object of interest 14 to get a sense of its orientation with respect to the recognition device 12, and the orientation results are then sent to the recognition device 12. AoA, ToA, PDoA, or TDoA may also be performed on the side of the recognition device 12 to an azimuth and/or elevation of the object of interest 14 from the perspective of the recognition device 12. Multilateration approaches, which require multiple "anchors" to localize a target, may also be used to obtain the coarse pose estimation of the objects of interest 14 (It is not mandatory for those "anchors" to be objects of interest).

The coarse pose estimation step can also determine whether the object of interest 14 is in the field of view of the recognition device 12. In some applications, the coarse pose estimation step may further anticipate when the object of interest 14 is likely to come into the field of view of the recognition device 12 if it is determined that the object of interest 14 is not currently in the field of view of the recognition device 12. As such, the recognition device 12 may determine when to switch from a low power mode (when the object of interest 14 is not currently in the field of view) to a high-resolution mode (when the object of interest 14 comes into the field of view) to maximize the precision, accuracy, or reactivity of a following fine-tuned localization performance (details are described below). In addition, when multiple objects of interest 14 are present (not shown), remote ranging procedures, which allow two objects of interest 14 to measure their relative distance and orientation, can be used to further increase the estimation robustness.

Once the data transmission step and the coarse pose estimation step are completed, a fine pose estimation step (step 116) may be performed to obtain a fine pose estimation of the object of interest 14. Herein, the recognition device 12 is configured to obtain the fine pose estimation only when the coarse pose estimation step determines that the object of interest 14 is in the field of view of the recognition device 12. The fine pose estimation step is performed by utilizing the characteristics of the object of interest 14 (obtained in the data transmission step) and the coarse pose estimation of the object of interest 14 (obtained in the coarse pose estimation step). During the fine pose estimation step, the recognition device 12 is configured to match reference images of the object of interest 14, which are obtained from the characteristics of the object of interest 14, to image features extracted from a segment of video flux provided by a camera within the recognition device 12. Herein, a search range for the matching process can be reduced by using the coarse pose estimation of the object of interest 14, otherwise the search range for the matching process would be very large considering all possible scales, orientation azimuths, and/or elevations of the object of interest 14 with respect to the recognition device 12. This reduced matching task can be implemented by image processing techniques based on scale-invariant feature transform (SIFT), speeded up robust features (SURF), features from accelerated segment test (FAST), binary robust independent elementary features (BRIEF), or oriented FAST and rotated BRIEF (ORB) features usage and robust Nearest Neighbor Search. Once the matching process is completed, a fine-grained delta/difference with respect to the coarse pose estimation of the object of interest 14 can be obtained by computing the homography (through standard linear algebra procedures) between the features (e.g., the SIFT, SURF or ORB features) extracted from the characteristics of the object of interest 14 and the features (e.g., the SIFT, SURF or ORB features) extracted from the video flux.

Finally, a reprojection step (step 118) is performed by utilizing the fine pose estimation of the object of interest 14 and the characteristics of the object of interest 14 to compute a visual representation of the object of interest 14. Herein, the visual representation of the object of interest 14 may be computed in the form of "visual augmentation layers" superimposed to video flux displayed to the user. The visual representation of the object of interest 14 matches the spatial pose of the object of interest 14, in a way allowing the user to interact with the object of interest 14 as if it was part of the virtual environment. The characteristics of the object of interest 14 are used to define a contour of the object of interest 14 within the video flux, where this contour is used to dissociate pixels related to the object of interest 14 from pixels related to the rest of the virtual environment. Then, the pixels of the objects of interest 14 are reprojected as is in the virtual environment. Typically, the visual representation of the object of interest 14 is combined with virtual objects and are displayed to the user together.

Figure 2:
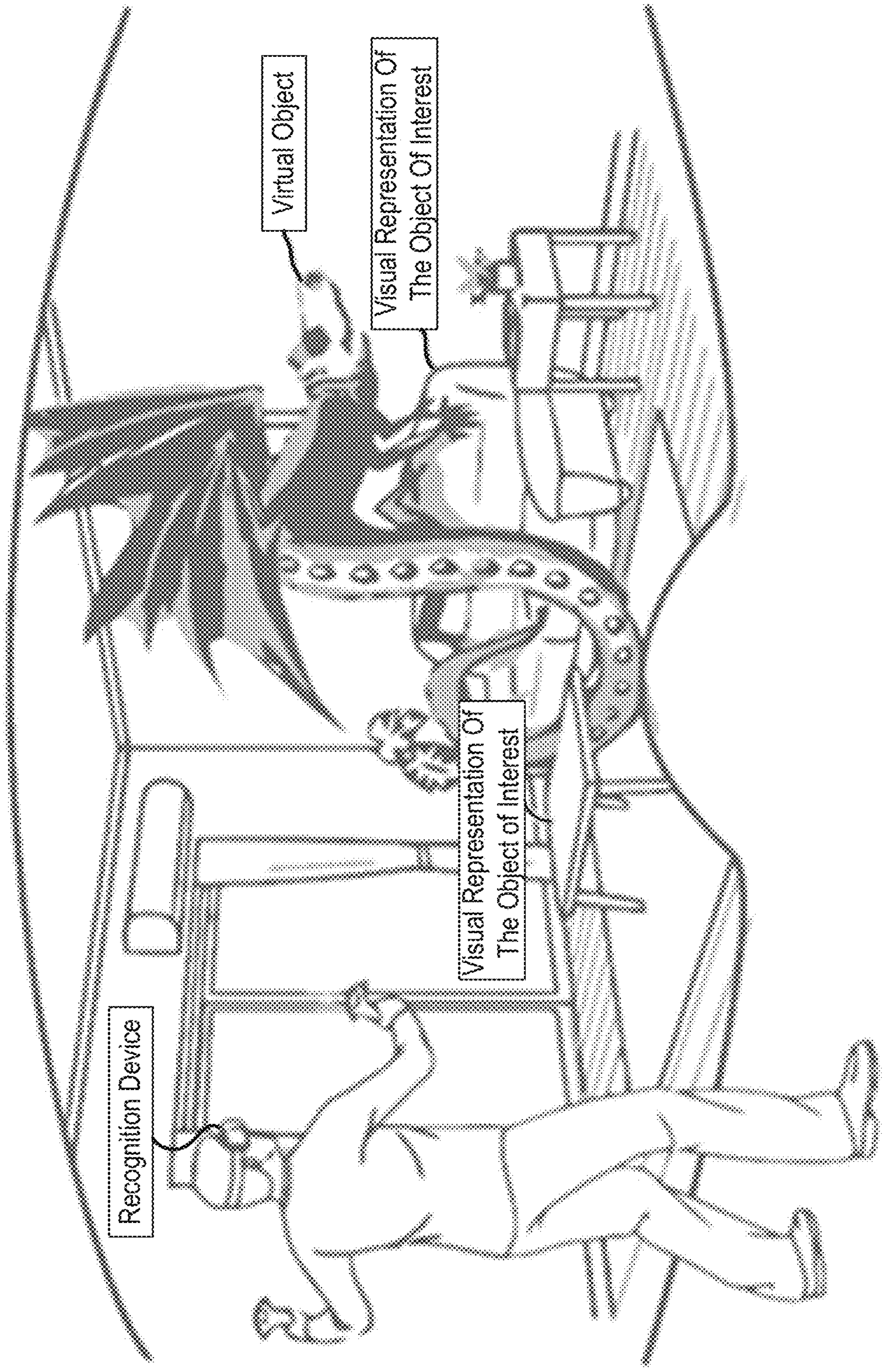
FIG. 2 illustrates an exemplary MR experience offered to a user by utilizing the MR system illustrated in FIG. 1.

FIG. 2 illustrates an exemplary MR experience offered to the user by utilizing the MR system 10 illustrated in FIG. 1. In this exemplary MR experience, the objects of interest 14 are a couch and a coffee table in the user's real-world environment, while the recognition device 12 is a user's headset. Visual representations of the couch and the coffee table and an artificial virtual dragon are displayed to the user via the headset. Herein, the couch and the coffee table are capable of communicating with the headset and transmitting data (e.g., both the couch and the coffee table contain radio application modules, not shown).

Figure 3:
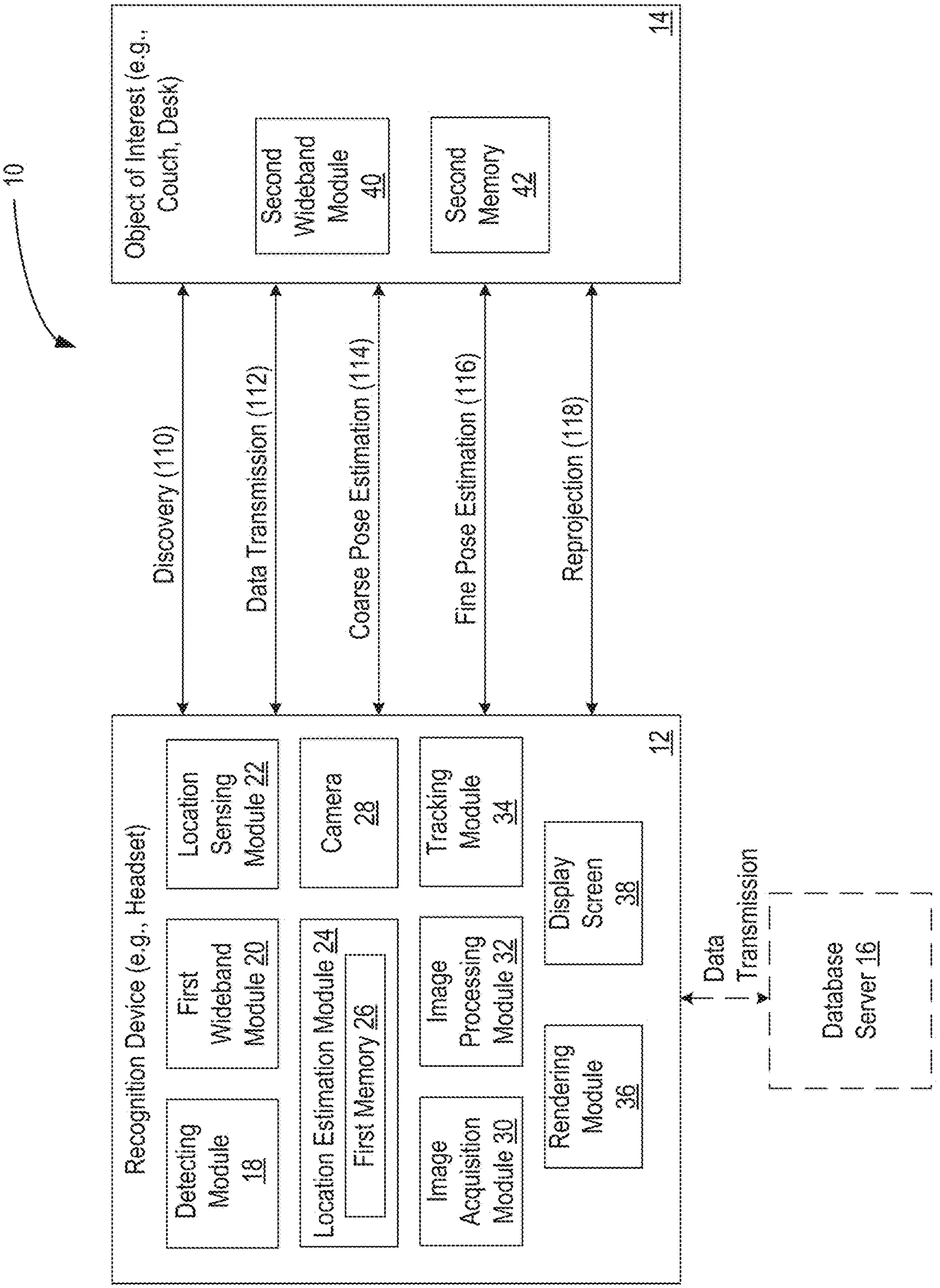
FIG. 3 illustrates a block diagram of the MR system illustrated in FIG. 1.

FIG. 3 illustrates a block diagram of the MR system 10, and FIG. 4 provides a flow diagram that illustrates an exemplary process of determining a visual pose of the object of interest 14 in the MR system 10 according to some embodiments of the present disclosure. In one embodiment, the recognition device 12 may include a detecting module 18, a first wideband module 20, a location sensing module 22, a location estimation module 24 with a first memory 26, a camera 28, an image acquisition module 30, an image processing module 32, a tracking module 34, a rendering module 36, and a display screen 38. The object of interest 14 may include a second wideband module 40 and a second memory 42. Herein, the first wideband module 20 and the second wideband module 40 enable the recognition device 12 and the object of interest 14 to communicate with each other (e.g., via radio frequency signals), even if the recognition device 12 and the object of interest 14 are sold separately (e.g., from different manufacturers/brands). The object of interest 14 may be a priori unknown to the recognition device 12. In different applications, the recognition device 12 may include fewer or more functional elements/modules, while the object of interest 14 may include more functional elements/modules.

As shown in FIG. 4, the detecting module 18 is configured to detect the presence of the object of interest 14 actively or passively. The detecting module 18 may send out periodical beacons and wait to receive a response from the object of interest 14 (e.g., from the second wideband module 40) via the wideband radio. Alternatively, the detecting module 18 may passively wait for a probe request sent by the object of interest 14 (e.g., from the second wideband module 40), and then send a probe response back to the object of interest 14 (e.g., back to the second wideband module 40) to confirm the reception of a presence of the object of interest 14.

The first wideband module 20 is configured to communicate with the second wideband module 40 once the first wideband module 20 is notified of the presence of the object of interest 14. The first wideband module 20 may be configured to send a characteristics request of the object of interest 14 to the second wideband module 40, and the second wideband module 40 may be configured to send the characteristics of the object of interest 14 back to the first wideband module 20. Alternatively, once the second wideband module 40 receives the probe response from the first wideband module 20, the second wideband module 40 will automatically send the characteristics of the object of interest 14 to the first wideband module 20. The characteristics of the object of interest 14 may be stored in the second memory 42. Herein, the characteristics of the object of interest 14 may be a 3D model of the object of interest 14, a series of photos of the object of interest 14 under different perspectives, or an identifier. The identifier includes sufficient information (e.g., a manufacturer and a serial number of the object of interest 14) for the recognition device 12/the first wideband module 20 to query external data information (e.g. the 3D model or photos of the object of interest 14) from the database server 16. As such, the first wideband module 20 is capable of obtaining reference images of the object of interest 14. In some applications, the detecting module 18 may be included in the first wideband module 20, while in some applications, the detecting module 18 may be a separate device, like a Bluetooth low energy (BLE) chipset.

The location sensing module 22 is configured to acquire RF signals related to spatial information of the object of interest 14 upon receiving a presence notice of the object of interest 14 from the detecting module 18 (or from the first wideband module 20, not shown), and configured to provide location metrics (e.g., ToA, AoA, PDoA, TDoA, etc.) to the location estimation module 24. Based on the location metrics, the location estimation module 24 is configured to provide location coordinates (e.g., spatial 3D coordinates in x, y, and z dimensions, spherical coordinates, cylindrical coordinates, etc.). Within the location estimation module 24, once a first location coordinate is estimated, it may be stored in the first memory 26 and can be reinfected to the location estimation module 24 to help in providing the location estimate at a following time step. It is because the angular/linear speed of both the recognition device 12 and the object of interest 14 is limited, and there should be no significant jumps in two subsequent location estimates.

In addition, the camera 28 is configured to capture live video flux of the object of interest 14, the image acquisition module 30 is configured to acquire image frames based on the captured video flux from the camera 28, and the image processing module 32 is configured to process the image frames to provide image features (such as: e.g., the SIFT, SURF or ORB features). The tracking module 34 is configured to calculate the fine pose of the object of interest 14 by matching the reference images of the object of interest 14 (from the first wideband module 20) to the image features extracted from the video flux provided by the camera 28. Herein, the search range for the matching process can be reduced by using the coordinates provided by the first memory 26, otherwise the search range for the matching process would be very large considering all possible scales, orientation azimuths, and/or elevations of the object of interest 14 with respect to the recognition device 12.

Furthermore, the rendering module 36 is configured to compute a visual representation of the object of interest 14 based on the calculated fine pose of the object of interest 14 from the tracking module 34 and the reference images of the object of interest 14 from the first wideband module 20. In addition, the rendering module 36 is configured to combine the visual representation of the object of interest 14 with artificial virtual objects. The visual representation of the object of interest 14 and the artificial virtual objects are computed in the form of "layers" superimposed to the video flux displayed to the user via the display screen 38.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A mixed reality (MR) system, comprising:

a recognition device including a first wideband module and a detecting module; and an object of interest that constitutes a real-world environment, a visual representation of the object of interest is capable of being superimposed in a virtual (VR) environment, wherein:

the object of interest comprises a second wideband module that is capable of communicating with the first wideband module of the recognition device via wideband radio;

the recognition device is capable of estimating a visual pose of the object of interest without pre-storing characteristics of the object of interest and configured to re-project the visual representation of the object of interest into the VR environment based on the estimated visual pose, wherein the visual representation of the object of interest matches the visual pose of the object of interest; and the detecting module of the recognition device is configured to detect a presence of the object of interest, and the second wideband module is configured to send at least one characteristic of the object of interest to the first wideband module after the presence of the object of interest is detected, wherein the at least one characteristic of the object of interest is one of a group consisting of a 3D model of the object of interest, a series of photos of the object of interest under different perspectives, and an identifier of the object of interest.

2. The MR system of claim 1 wherein:

the detecting module is configured to send out periodical beacons;

the second wideband module is configured to listen to the periodical beacons and to send a response back to the detecting module in response to the periodical beacons; and the detecting module is configured to receive the response from the second wideband module so as to detect the presence of the object of interest.

3. The MR system of claim 2 wherein:

the first wideband module is configured to send a characteristic request of the object of interest to the second wideband module once the first wideband module is notified of the presence of the object of interest; and the second wideband module is configured to send the at least one characteristic of the object of interest to the first wideband module in response to the characteristic request.

4. The MR system of claim 1 wherein:

the second wideband module is configured to actively send out a probe request; and the detecting module is configured to receive the probe request from the second wideband module and to send a probe response back to the second wideband module to confirm a reception of the presence of the object of interest.

5. The MR system of claim 4 wherein:

the second wideband module is configured to send the at least one characteristic of the object of interest to the first wideband module once the second wideband module receives the probe response.

6. The MR system of claim 1 wherein the object of interest further comprises a memory, which stores the at least one characteristic of the object of interest.

7. The MR system of claim 1 wherein:

the at least one characteristic of the object of interest is the identifier of the object of interest; and the first wideband module is configured to query an external database for the 3D model or the photos of the object of interest based on the identifier of the object of interest.

8. The MR system of claim 1 wherein the recognition device is configured to obtain a coarse pose estimation of the object of interest via wideband radio, wherein the coarse pose estimation of the object of interest includes a distance estimation between the recognition device and the object of interest, and an orientation estimation of the object of interest.

9. The MR system of claim 8 wherein the recognition device is configured to obtain a fine pose estimation of the object of interest by matching reference images to image features extracted from a segment of video flux provided by a camera within the recognition device, wherein:

the reference images are obtained from the at least one characteristic of the object of interest; and a search range of the matching process is limited by the coarse pose estimation of the object of interest.

10. The MR system of claim 9 wherein the coarse pose estimation of the object of interest further determines whether the object of interest is in a field of view of the recognition device.

11. The MR system of claim 10 wherein the recognition device is configured to obtain the fine pose estimation of the object of interest only when the coarse pose estimation of the object of interest determines that the object of interest is in the field of view of the recognition device.

12. The MR system of claim 10 wherein the coarse pose estimation of the object of interest further anticipates when the object of interest will come into the field of view of the recognition device if it is determined that the object of interest is not currently in the field of view of the recognition device.

13. The MR system of claim 8 wherein:

the object of interest is configured to provide location metrics, which at least include information of the orientation estimation of the object of interest with respect to the recognition device; and the recognition device is configured to obtain the location metrics from the object of interest.

14. The MR system of claim 8 wherein the recognition device further comprises a location sensing module and a location estimation module, wherein:

upon receiving a presence notice of the object of interest from the detecting module, the location sensing module is configured to acquire radio frequency (RF) signals related to spatial information of the object of interest;

the location sensing module is configured to provide location metrics to the location estimation module, wherein the location metrics at least include information of the orientation estimation of the object of interest from the perspective of the recognition device; and the location estimation module is configured to provide location coordinates based on the location metrics.

15. The MR system of claim 14 wherein:

the location metrics are one or more of Angle of Arrival (AoA), Time of Arrival (ToA), Phase Difference of Arrival (PDA), and Time Difference of Arrival (TDoA); and the location coordinates are spatial 3D coordinates in x, y, and z dimensions, spherical coordinates, or cylindrical coordinates.

16. The MR system of claim 14 wherein the recognition device further comprises a camera, an image acquisition module, an image processing module, and a tracking module, wherein:

the camera is configured to capture live video flux of the object of interest;

the image acquisition module is configured to acquire image frames based on the captured live video flux from the camera;

the image processing module is configured to process the image frames to provide image features; and the tracking module is configured to calculate a fine pose of the object of interest by matching reference images of the object of interest to the image features provided by the image processing module.

17. The MR system of claim 16 wherein:

the reference images are obtained from the first wideband based on the at least one characteristic of the object of interest; and a search range of the matching process is limited by the coarse pose estimation of the object of interest.

18. The MR system of claim 17 wherein:

the location estimation module comprises a memory that is configured to store the location coordinates and configured to provide the location coordinates to the tracking module; and the search range of the matching process is limited by using the coordinates provided by the memory.

19. The MR system of claim 16 wherein the recognition device further comprises a rendering module that is configured to compute the visual representation of the object of interest based on the calculated fine pose of the object of interest from the tracking module and the reference images of the object of interest from the first wideband module.

20. The MR system of claim 19 wherein the rendering module is further configured to combine the visual representation of the object of interest with artificial virtual objects in a form of “layers” superimposed to the captured live video flux.

21. A recognition device within a mixed reality (MR) system, comprising:

a camera;

a first wideband module capable of communicating with an object of interest to obtain characteristics of the object of interest, thereby obtaining reference images of the object of interest, wherein:

the object of interest constitutes a real-world environment; and the recognition device does not pre-store the characteristics of the object of interest;

a tracking module configured to calculate a visual pose of the object of interest by matching the reference images of the object of interest to image features extracted from a segment of video flux provided by the camera; and a rendering module configured to compute a visual representation of the object of interest based on the calculated visual pose of the object of interest and the reference images of the object of interest.

22. A method for visual pose determination of an object of interest in a mixed reality (MR) system, comprising:

advertising a presence of the object of interest to a recognition device;

transmitting data between a first wideband module of the recognition device and a second wideband module of the object of interest via wideband radio, wherein:

the object of interest constitutes a real-world environment and a visual representation of the object of interest is capable of being superimposed into a virtual (VR) environment;

the transmitted data includes at least one characteristic of the object of interest, which is not pre-stored in the recognition device, and is sent from the second wideband module to the first wideband module after the presence of the object of interest is advertised; and the at least one characteristic of the object of interest is one of a group consisting of a 3D model of the object of interest, a series of photos of the object of interest under different perspectives, and an identifier of the object of interest;

performing a coarse pose estimation of the object of interest;

performing a fine pose estimation of the object of interest based on the coarse pose estimation of the object of interest; and reprojecting by the recognition device the visual representation of the object of interest into the VR environment.

23. The method of claim 22 wherein:

the object of interest is a couch or a desk; and the recognition device is a movable device.

* * * * *